United States Patent
Stahl

(10) Patent No.: US 10,866,112 B2
(45) Date of Patent: Dec. 15, 2020

(54) METHOD FOR ARRANGING AND DISPLAYING GRAPHIC ELEMENTS OF A DISPLAY OF A VEHICLE NAVIGATION SYSTEM

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/038,376

(22) Filed: Jul. 18, 2018

(65) Prior Publication Data

US 2018/0321053 A1    Nov. 8, 2018

Related U.S. Application Data

(63) Continuation of application No. PCT/EP2017/050540, filed on Jan. 12, 2017.

(30) Foreign Application Priority Data

Jan. 19, 2016   (DE) .................. 10 2016 200 608

(51) Int. Cl.
*G09G 5/02* (2006.01)
*G01C 21/36* (2006.01)
*G06T 11/60* (2006.01)

(52) U.S. Cl.
CPC ....... *G01C 21/367* (2013.01); *G01C 21/3697* (2013.01); *G06T 11/60* (2013.01); *G06T 2210/62* (2013.01)

(58) Field of Classification Search
None
See application file for complete search history.

(56) References Cited

U.S. PATENT DOCUMENTS 5,016,105 A * 5/1991 Muller ............... H04N 5/275
                                                       348/585
5,917,436 A * 6/1999 Endo ................ G01C 21/3635
                                                       340/995.14

(Continued)

FOREIGN PATENT DOCUMENTS

DE            103 13 743 A1    10/2004
DE     10 2007 030 229 A1      1/2009

(Continued)

OTHER PUBLICATIONS

International Search Report (PCT/ISA/210) issued in PCT Application No. PCT/EP2017/050540 dated Apr. 4, 2017 with English translation (five pages).

(Continued)

*Primary Examiner* — Anh-Tuan V Nguyen
(74) *Attorney, Agent, or Firm* — Crowell & Moring LLP

(57) ABSTRACT

A method arranges and displays graphic elements of a display of a vehicle navigation system within a display surface, the graphic elements including at least one geographical element and one non-geographical element. The quantity of information that can be directly registered by the driver is increased. The at least one non-geographical element is arranged and displayed within the display surface such that the likelihood of the at least one geographical element being covered by the at least one non-geographical element is minimised and in particular completely avoided.

9 Claims, 3 Drawing Sheets

(56) References Cited

U.S. PATENT DOCUMENTS

| | | | | |
|---|---|---|---|---|
| 8,928,657 B2* | 1/2015 | Bailiang | | G06T 15/08 345/419 |
| 2005/0188326 A1* | 8/2005 | Ikeda | | G06T 11/60 715/788 |
| 2007/0208506 A1* | 9/2007 | Macneille | | G01C 21/3602 701/533 |
| 2007/0225902 A1* | 9/2007 | Gretton | | G08G 1/096861 701/533 |
| 2007/0268415 A1* | 11/2007 | Ukyou | | H04S 7/30 348/760 |
| 2008/0161997 A1 | 7/2008 | Wengelnik et al. | | |
| 2008/0167802 A1* | 7/2008 | Yoshioka | | G01C 21/3611 701/533 |
| 2009/0051702 A1* | 2/2009 | Morbey | | G01C 21/32 345/629 |
| 2009/0100363 A1* | 4/2009 | Pegg | | G06F 3/04817 715/765 |
| 2009/0169060 A1* | 7/2009 | Faenger | | G09B 29/007 382/113 |
| 2010/0198506 A1* | 8/2010 | Neilhouse | | G01C 21/365 701/532 |
| 2010/0280747 A1* | 11/2010 | Achthoven | | G01C 21/3638 701/532 |
| 2011/0122153 A1* | 5/2011 | Okamura | | G09B 29/106 345/629 |
| 2011/0144909 A1* | 6/2011 | Ren | | G01C 21/3638 701/455 |
| 2011/0246921 A1* | 10/2011 | Mercuri | | G06F 3/0481 715/771 |
| 2012/0274652 A1* | 11/2012 | Sung | | G09B 29/007 345/592 |
| 2012/0304087 A1* | 11/2012 | Walkin | | H04L 12/1813 715/764 |
| 2013/0124082 A1 | 5/2013 | Cho | | |
| 2013/0283154 A1* | 10/2013 | Sasakura | | G06F 40/106 715/253 |
| 2014/0053077 A1* | 2/2014 | Unnikrishnan | | G01C 21/3664 715/747 |
| 2014/0098132 A1* | 4/2014 | Fein | | G06T 19/006 345/633 |
| 2014/0123062 A1* | 5/2014 | Nguyen | | G01C 21/3611 715/810 |
| 2014/0164989 A1* | 6/2014 | Kuhne | | G06F 3/0488 715/790 |
| 2014/0267282 A1* | 9/2014 | Ren | | G01C 21/00 345/428 |
| 2015/0248781 A1* | 9/2015 | Zimmer | | G09G 5/14 345/619 |
| 2015/0276423 A1 | 10/2015 | McIlhany et al. | | |
| 2015/0331238 A1* | 11/2015 | Roth | | B60K 37/00 348/115 |
| 2016/0203628 A1* | 7/2016 | Okumura | | G06F 3/04817 715/733 |
| 2016/0227149 A1* | 8/2016 | Dickens | | G11B 27/00 |
| 2017/0169592 A1* | 6/2017 | Ruble | | G06T 11/60 |

FOREIGN PATENT DOCUMENTS

| | | |
|---|---|---|
| DE | 10 2011 015 216 A1 | 9/2012 |
| EP | 2 672 377 A2 | 12/2013 |
| WO | WO 2006/108617 A2 | 10/2006 |

OTHER PUBLICATIONS

German-language Written Opinion (PCT/ISA/237) issued in PCT Application No. PCT/EP2017/050540 dated Apr. 4, 2017 (five pages).

German-language Search Report issued in counterpart German Application No. 10 2016 200 608.8 dated Dec. 13, 2016 with partial English translation (14 pages).

\* cited by examiner

METHOD FOR ARRANGING AND DISPLAYING GRAPHIC ELEMENTS OF A DISPLAY OF A VEHICLE NAVIGATION SYSTEM

CROSS REFERENCE TO RELATED APPLICATIONS

This application is a continuation of PCT International Application No. PCT/EP2017/050540, filed Jan. 12, 2017, which claims priority under 35 U.S.C. § 119 from German Patent Application No. 10 2016 200 608.8, filed Jan. 19, 2016, the entire disclosures of which are herein expressly incorporated by reference.

BACKGROUND AND SUMMARY OF THE INVENTION

The present invention relates to a method for arranging and displaying graphical elements of a display of a vehicle navigation system. The invention further relates to a vehicle navigation system and to a vehicle, in particular a motor vehicle.

The display panels of vehicle navigation systems of modern motor vehicles can be used for a multiplicity of depictions. Besides two-dimensional map depictions of the surroundings of the motor vehicle, it is possible for realistic three-dimensional perspective depictions of the surroundings of the motor vehicle to be displayed, for example. Such two- or three-dimensional map and/or surroundings depictions can also be used to show the journey route traveled on hitherto and/or scheduled to be ahead. Additionally, further information is frequently depicted on the display panel. This may be information relating to the navigation, such as, for example, the destination address, the probable arrival time, the remaining journey time, POIs (points of interest), etc. Further, it may be information that does not relate to the navigation. By way of example, the display panel of a vehicle navigation system can be used to display information pertaining to the radio station being received at present.

The aim is thus for the driver of a modern motor vehicle to have a multiplicity of information displayed to him. The space requirement for displaying this information can exceed the size of the display screen of the vehicle navigation system. The displayed graphical elements can partly overlap in this case, so that not every piece of information is readable at every instant. However, the information is always supposed to be depicted such that the driver can pick it up as effortlessly as possible, so as not to divert his attention from the traffic.

DE 103 13 743 A1 relates to a method and an apparatus for depicting driver information. In this case, there is provision for the output of route guidance display objects and information objects. The displayed objects can be trimmed by removing subregions in order to partly allow for concealments by concealing objects.

DE 10 2011 015 216 A1 relates to visualization of address points on maps. The address points can be depicted as symbols. In order to prevent complete concealment of details of possible interest by the symbols, said symbols can be depicted semitransparently.

DE 10 2007 030 229 A1 teaches a method for low-concealment depiction of closely adjacent topographical objects in stylized form. In this case, concealment of topographical elements of a map by objects is avoided by means of time-based and/or space-based depiction of the objects and/or depiction of the objects in a popup window and/or by means of a change to the map scale.

The object which arises is that of improving the depiction of a vehicle navigation system such that the amount of information that the driver can pick up immediately is increased.

The object is achieved by a method, a vehicle navigation system and a vehicle in accordance with embodiments of the invention. Advantageous developments of the invention are described and claimed herein.

The invention is formed by a first method for arranging and displaying graphical elements of a depiction of a vehicle navigation system within a display panel, wherein the graphical elements comprise at least one geographical element and one nongeographical element. In a first method step, the at least one geographical element is arranged and displayed within the display panel. In a second step, the at least one nongeographical element is arranged and displayed within the display panel. This is effected according to the invention such that the masking of the at least one geographical element by the at least one nongeographical element is minimized and, in particular, avoided completely.

Geographical elements are, in particular, elements of a map depiction of the navigation system such as, for example, roads, journey routes, descriptors (e.g. place names, road names, object names, pictograms) or object depictions (e.g. depictions of houses, bridges, etc.). Nongeographical elements are, in particular, elements that are not parts of the map depiction of the navigation system. In particular, nongeographical elements can comprise what are known as information boxes or info boxes, that is to say areas in which information is reproduced in text form and/or in graphical form. Information boxes can include the following information, for example:

calendar information, e.g. date, time of day, calendar entries;
media information, e.g. information pertaining to the chosen media reproduction (source (radio, CD, memory card, Bluetooth device, etc.), name/frequency of a radio station, title/artist of a piece of music and the like);
traffic information, e.g. traffic reports;
navigation information, e.g. selected destination, probable arrival time, remaining journey distance, remaining journey time;
communication information, e.g. mobile radio information (network operator, signal strength and the like).

The inventor has recognized that the known and standard arrangement of nongeographical elements, in particular of information boxes, at fixed and invariable locations within the display panel can result in geographical elements that may be significant to the driver (e.g. a journey route ahead) being concealed by the nongeographical elements, while other areas of the display panel remain unused (free areas). According to the invention, the at least one nongeographical element is arranged and displayed within the display panel such that the masking of the at least one geographical element by the at least one nongeographical element is minimized and, in particular, avoided completely. In other words, the invention thus dispenses with displaying nongeographical elements, in particular info boxes, at firmly prescribed and invariable locations within the display panel. Instead, the nongeographical elements are placed within the display panel such that the display of the geographical elements is impaired as little as possible. By way of example, this can involve information boxes being placed in the aforementioned free areas of the display panel.

It should be pointed out that the individual steps of the method according to the invention and its embodiments do not necessarily have to be performed in a predetermined order or even in succession. Rather, some steps can expediently also be performed at the same time. In particular, there may be provision for all the graphical elements to be arranged first of all, that is to say for the location of the display panel at which the relevant graphical element is supposed to be displayed to be determined for each graphical element. The result of the steps of arranging the elements may be that a graphics memory is filled with the content to be displayed from the display panel, for example. The steps of displaying the graphical elements can then be performed at the same time. Thus, the whole depiction, that is to say the complete content of the display panel, becomes visible at the same instant.

A first advantageous configuration of the method presupposes that the graphical elements comprise at least two geographical elements of different type. Examples of types of geographical elements comprise roads, journey routes, descriptors and object depictions. Each of the at least two geographical elements is then assigned either to a first priority class or to a further priority class. To this end, at least two priority classes are thus defined. The at least two geographical elements are arranged and displayed within the display panel. Subsequently, the at least one nongeographical element is arranged and displayed within the display panel such that the masking of the geographical elements assigned to the first priority class by the at least one nongeographical element is minimized and, in particular, avoided completely. In other words, when arranging and displaying the at least one nongeographical element, only masking of the geographical elements assigned to the first priority class is avoided, but not masking of those geographical elements that are not assigned to the first priority class. This provides a better way of achieving the effect that only geographical elements that have a particularly high level of relevance to the driver are not concealed by nongeographical elements. Since only the masking of these geographical elements assigned to the first priority class is avoided, it is advantageously possible to achieve the effect that the nongeographical elements have a higher probability of being able to be arranged at their original position within the display panel.

It is particularly advantageous if the type of geographical elements assigned to the first priority class includes roads and in particular roads that have already been traveled on by the vehicle, are being traveled on by the vehicle at present, and/or will probably be traveled on by the vehicle in the future. By way of example, the effect that can be achieved by this is that, with the route guidance of the navigation system activated, the journey route on which to travel, in particular the journey route already traveled and/or the journey route scheduled to be traveled, is displayed to the driver without masking. By contrast, other geographical elements of less relevance to the driver (e.g. roads that are not part of the intended journey route) can then be concealed by the nongeographical elements, so that they have a higher probability of being able to be arranged at or close to their original position within the display panel.

In an advantageous manifestation, the already traveled journey route and the journey route scheduled to be traveled can be assigned to different priority classes. By way of example, masking of the already traveled journey route by nongeographical elements may thus be permitted, whereas the journey route scheduled to be traveled is not masked, however.

It is a possibility that when the at least one nongeographical element is arranged within the display panel, masking of the at least one geographical element by the at least one nongeographical element cannot be avoided completely. In this case, an advantageous development of the method can provide for the at least one nongeographical element to be displayed in an at least partly transparent depiction. In other words, the at least one nongeographical element masking at least one geographical element at least partly is then depicted transparently (that is to say in see-through fashion), so that the geographical element masked by the nongeographical element remains visible and therefore discernible despite the masking by the nongeographical element.

The invention is further formed by a second method for arranging and displaying graphical elements of a depiction of a vehicle navigation system within a display panel, wherein the graphical elements comprise at least one geographical element and one nongeographical element. In this case, in a first step, the at least one geographical element is arranged and displayed within the display panel, and in a second step, the at least one nongeographical element is arranged and displayed within the display panel. The second method according to the invention is characterized in that the at least one nongeographical element is displayed in an at least partly transparent depiction if the at least one nongeographical element masks the at least one geographical element at least partly.

The second method according to the invention differs from the previously described first method according to the invention in that the second method involves the nongeographical elements being arranged at a respective predetermined position within the display panel in any case, regardless of whether or not a nongeographical element, at its respective predetermined positon, masks a geographical element. This has the advantage that the nongeographical elements can be picked up more easily by the driver on account of the invariability of their positions. The problem of the possible masking of a geographical element by a nongeographical element is achieved according to the invention by virtue of the at least one nongeographical element being depicted at least partly transparently in the event of masking, so that the geographical element it masks remains visible and therefore discernible despite the masking.

The second method according to the invention may particularly advantageously also have provision for the geographical elements to comprise at least two geographical elements of different type, wherein each of the at least two geographical elements is assigned to a first or a further priority class. The at least one nongeographical element is displayed in an at least partly transparent depiction only if it masks at least one geographical element assigned to the first priority class at least partly.

Particularly advantageously, the type of geographical elements assigned to the first priority class comprises roads and in particular roads that have already been traveled on by the vehicle, are being traveled on by the vehicle at present and/or will probably be traveled on by the vehicle in the future. In this regard, reference is made to the explanations pertaining to the first method according to the invention that are provided above.

The invention moreover consists of a vehicle navigation system having a display panel for displaying graphical elements, wherein the vehicle navigation system is set up to perform one of the previously described methods, and of a vehicle, in particular a motor vehicle, having such a vehicle navigation system.

Other objects, advantages and novel features of the present invention will become apparent from the following detailed description of one or more preferred embodiments when considered in conjunction with the accompanying drawings.

Like reference signs denote like features of the depicted embodiments of the invention in the figures. It is pointed out that the depicted figures and the associated description are merely exemplary embodiments of the invention. In particular, depictions of combinations of features in the figures and/or in the description of the figures are not intended to be interpreted to mean that the invention necessarily requires implementation of all the cited features. Other embodiments of the invention can contain fewer, more and/or other features. The scope of protection and the disclosure of the invention emerge from the accompanying patent claims and the complete description. It is also pointed out that the depictions are basic depictions of embodiments of the invention. The arrangement of the individual depicted elements in relation to one another is chosen only by way of example and can be chosen differently for other embodiments of the invention.

DETAILED DESCRIPTION OF THE DRAWINGS

Figure 1:
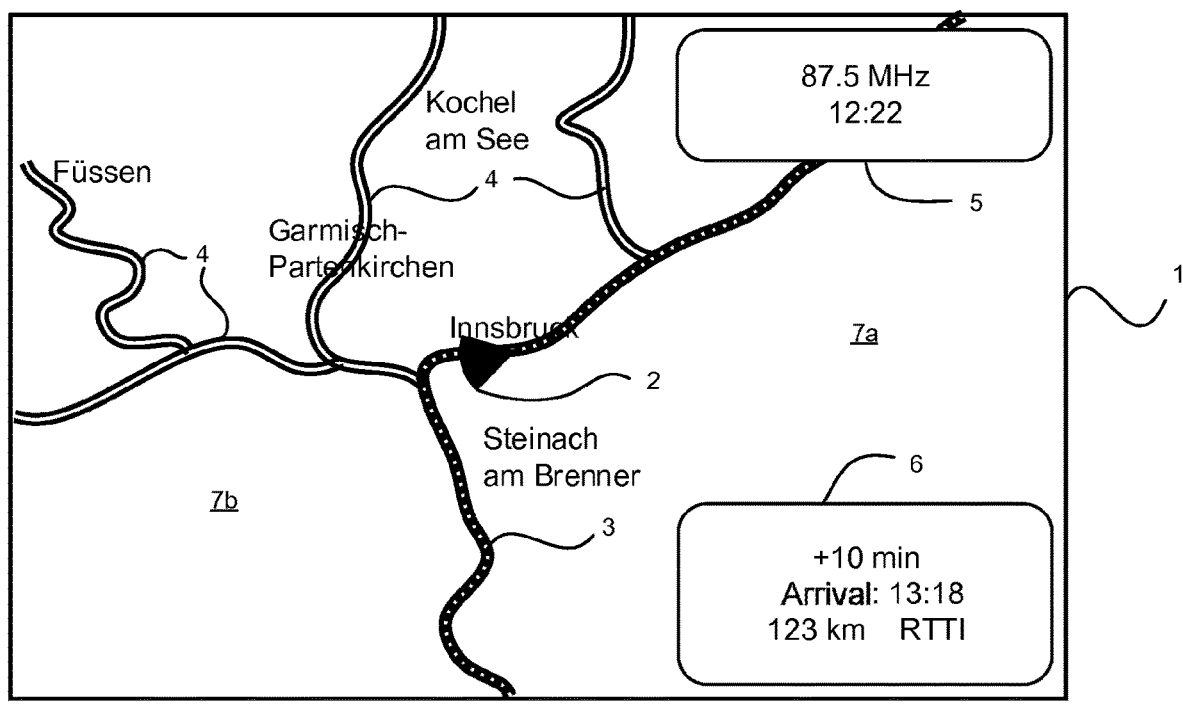
FIG. 1 shows a display panel of a vehicle navigation system with a depiction of graphical elements based on the prior art.

The display panel 1 of a vehicle navigation system based on the prior art, as shown in FIG. 1, has the depiction of various graphical elements 2, 3, 4, 5, 6 discernible. The depiction comprises a two-dimensional map depiction of the surroundings of the driver's own motor vehicle (ego vehicle). The map depiction comprises roads 4. In the example depicted, the route guidance of the vehicle navigation system is activated and the journey route 3 that has been traveled on by the ego vehicle in the past and is scheduled to be traveled on in the future according to the selected route guidance is graphically highlighted. An approximately triangular symbol 2 depicts the position and direction of travel of the ego vehicle. The map depiction further comprises place names (not provided with reference signs) for selected towns within the map detail. Further, the display panel 1 has two nongeographical elements depicted on it, namely the information boxes 5, 6. The information box 5 has a frequency of a currently selected radio station and a present time of day depicted in it. The information box 6 has information pertaining to the present route guidance of the vehicle navigation system depicted in it, namely (from top to bottom) a time statement for a journey time extension conditional upon the current traffic situation, a probable arrival time, a length of the remaining journey distance and a piece of information stating that information pertaining to the present traffic situation is being received by the vehicle navigation system (real-time traffic information="RTTI").

The depiction of FIG. 1 clearly reveals that the information box 5 partly masks the journey route 3. The driver can therefore discern the profile of the selected journey route within the depicted map detail only to a restricted degree. At the same time, there are free areas 7a, 7b within the display panel 1, however, that have no graphical elements displayed in them.

Figure 2:
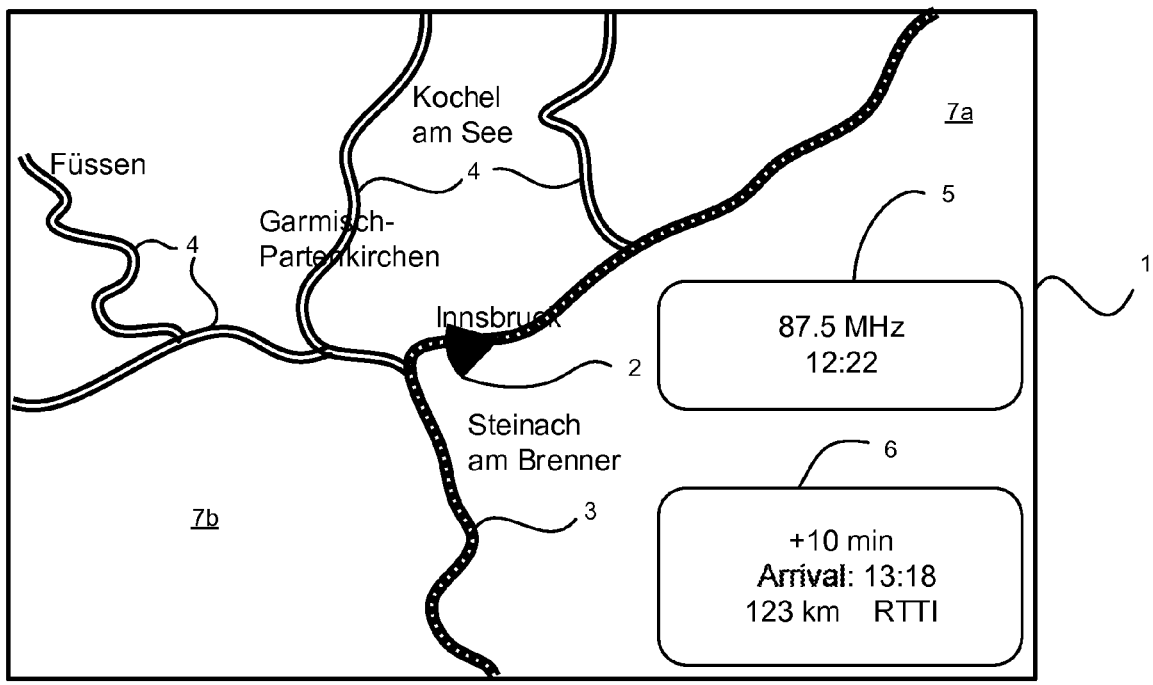
FIG. 2 shows a display panel of a vehicle navigation system with a depiction of graphical elements based on an embodiment of the first method according to the invention.
Figure 4:
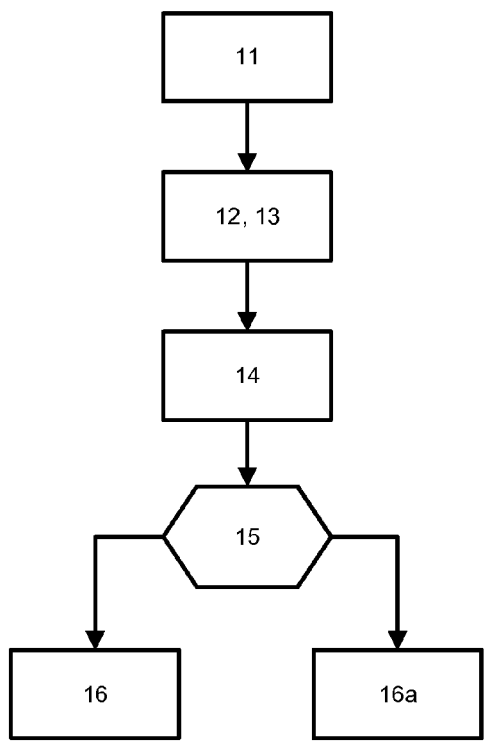
FIG. 4 is a flowchart for an embodiment of the first method according to the invention.

An embodiment of the first method according to the invention will be explained in more detail on the basis of the flowchart shown in FIG. 4. The depiction resulting from performance of the method depicted in FIG. 4 is shown in FIG. 2.

First of all, the geographical elements 2, 3, 4 are assigned to a respective priority class in step 11. This involves the journey route 3 computed as part of the activated route guidance and the vehicle symbol 2 being assigned to a first priority class and all further geographical elements (roads 4 and place names) being assigned to a further priority class. In other words, this embodiment of the first method according to the invention thus has provision for only the masking of the vehicle symbol 2 and the journey route 3 by nongeographical elements to be avoided, whereas the masking of all other geographical elements is permitted.

Subsequently, the geographical elements 2, 3, 4 are arranged 12 and displayed 13 within the display panel 1 in steps 12 and 13. It should be pointed out again that the sequence of the method steps 12, 13, 14, 15, 16, 16a does not necessarily have to occur sequentially. By way of example, it is possible for all the graphical elements to be arranged 12, 14 first of all, then for a data representation of the graphical elements to be stored in a graphics memory of the vehicle navigation system and finally for the content of the graphics memory to be depicted 13, 16, 16a on the display panel 1.

In step 14, the information boxes 5, 6 are arranged within the display panel 1 such that the masking of the geographical elements assigned to the first priority class (that is to say the route 3 and the vehicle symbol 2) is minimized and in particular avoided completely. There may be provision for the information boxes 5, 6 preferably to be arranged at their respective originally provided positions. In the present example, these may be the positions that the information boxes 5, 6 adopt in the depiction shown in FIG. 1. A comparison of FIGS. 1 and 2 shows that the information box 6 can be arranged at its originally provided position (at the bottom right of the display panel 1), since it conceals no geographical elements there. By contrast, the information box 5 needs to be arranged at a different position from the originally provided position depicted in FIG. 1 (at the top right of the display panel 1) in step 14, since it would partly mask the route 3 there. The information box 5 can be arranged using the existing free areas 7a, 7b. As is discernible in FIG. 2, there is at least one possibility of arranging the information box 5 such that masking of the geographical elements 2, 3, 4 by the information box 5 is avoided completely. The arrangement at this position depicted in FIG. 2 is the result of step 14.

In step 15, the circumstance of whether the arrangement of the nongeographical elements 5, 6 within the display panel 1 occurred such that the masking of at least the geographical elements 2, 3 assigned to the first priority class by the nongeographical elements 5, 6 was able to be avoided completely is checked.

In the depiction shown in FIG. 2, it is discernible that the information box 5 was able to be arranged within the display panel 1 such that masking of the journey route 3 was avoided completely. A comparison of FIGS. 1 and 2 shows that the masking of the journey route 3 by the information box 5 is avoidable by virtue of the information box 5 accordingly being arranged within the available free area 7a. In the present example, the check performed in step 15 therefore reveals that all the nongeographical elements 5, 6 were able to be arranged within the display panel 1 such that no geographical elements 2, 3, 4 are masked. In this example, the performance of the method therefore ends with step 16, in which the nongeographical elements 5, 6 are displayed.

If, by contrast, the result of the check performed in step 15 had turned out such that at least one of the geographical elements 2, 3 assigned to the first priority class had been at least partly masked by at least one of the nongeographical elements 5, 6, then the method would have been continued with step 16a, in which the at least one nongeographical element causing the masking would be displayed in an at least partly transparent depiction.

Figure 3:
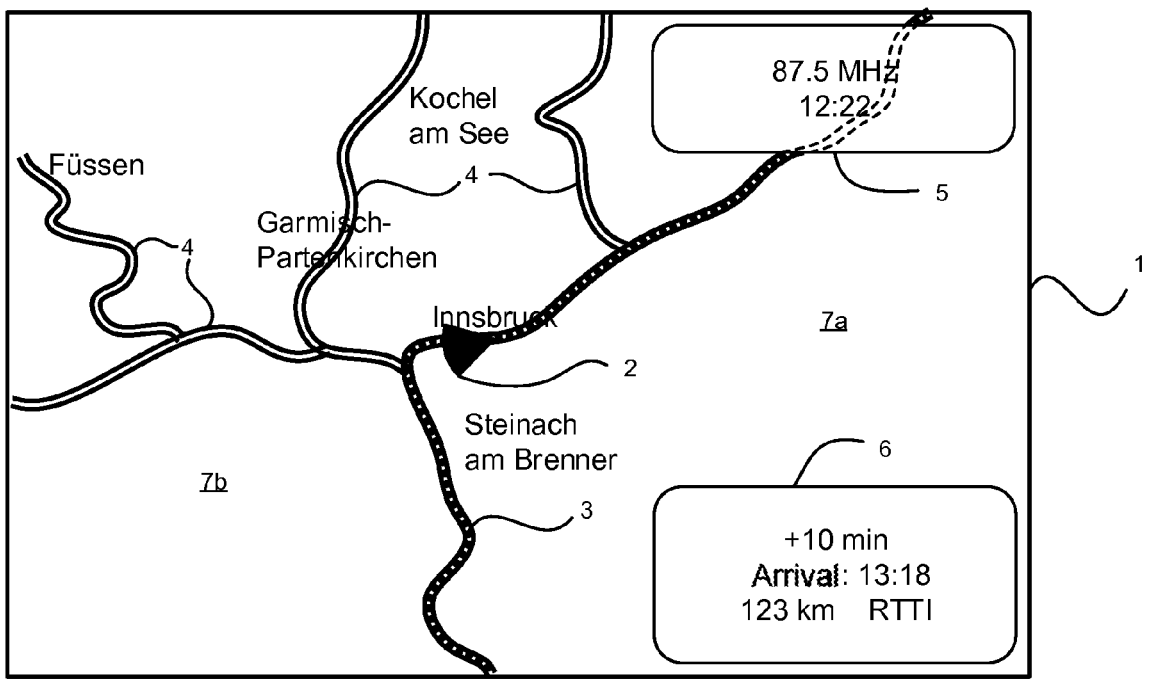
FIG. 3 shows a display panel of a vehicle navigation system with a depiction of graphical elements based on an embodiment of the second method according to the invention.
Figure 5:
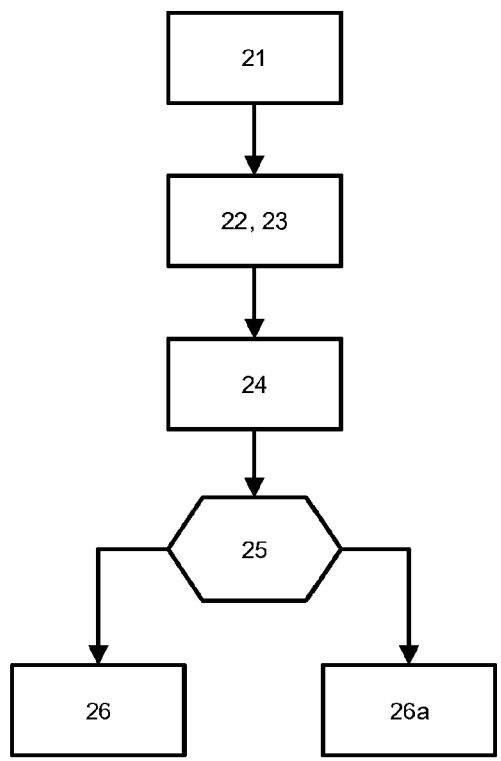
FIG. 5 is a flowchart for an embodiment of the second method according to the invention.

An embodiment of the second method according to the invention will be explained in more detail on the basis of the flowchart shown in FIG. 5. The depiction resulting from performance of the method depicted in FIG. 5 is shown in FIG. 3.

First of all, the geographical elements 2, 3, 4 are each assigned to a priority class in step 21. This involves the journey route 3 computed as part of the activated route guidance and the vehicle symbol 2 being assigned to a first priority class and all further geographical elements (roads 4 and place names) being assigned to a further priority class. In other words, this embodiment of the second method according to the invention thus has provision for only the masking of the vehicle symbol 2 and the journey route 3 by nongeographical elements to be avoided, whereas the masking of all other geographical elements is permitted.

Subsequently, the geographical elements 2, 3, 4 are arranged 22 and displayed 23 within the display panel 1 in steps 22 and 23. For the sequence of the method steps 22, 23, 24, 25, 26, 26a, reference can be made to the observations above, which likewise apply here. In contrast to the method flow based on the first method according to the invention, as depicted in FIG. 4, the method flow based on the second method according to the invention, as depicted in FIG. 5, does not have provision for the nongeographical elements 5, 6 to be arranged at a different position within the display panel 1 (for example within the free areas 7a, 7b) in the event of possible masking. In comparison with FIGS. 1 and 3, it is therefore discernible that the information box 5 was arranged at the same position (step 24), even though it masks the journey route 3.

In step 25, the circumstance of whether the arrangement of the nongeographical elements 5, 6 within the display panel 1 that occurred in step 24 occurred such that the masking of at least the geographical elements 2, 3 assigned to the first priority class by the nongeographical elements 5, 6 was able to be avoided completely is checked.

In the depiction shown in FIG. 3, it is discernible that the information box 5 was arranged within the display panel 1 such that it partly masks the journey route 3. By contrast, the information box 6 does not mask a geographical element. The check performed in step 25 therefore reveals different results for the elements 5, 6. In this example, the method is thus continued with step 26 for the element 6 and with step 26a for the element 5.

In step 26, the information box 6 is displayed in a regular depiction.

In step 26a, the information box 5 is displayed in an at least partly transparent depiction, so that the route 3 masked by the information box 5 continues to remain discernible. This is illustrated symbolically in FIG. 3 by virtue of the route 3 masked by the element 5 being shown in dashes.

LIST OF REFERENCE SIGNS

1 Display panel
2 Motor vehicle (depiction)
3 Road as journey route (depiction)
4 Road (depiction)
5, 6 Information boxes
7a, 7b Free areas
11-26a Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for arranging and displaying graphical elements of a depiction of a vehicle navigation system within a display panel, wherein the graphical elements comprise at least one geographical element and one non-geographical element, the method comprising the steps of:
  arranging and displaying the at least one geographical element within the display panel, wherein a geographical element is an element of a map depiction of the navigation system; and
  arranging and displaying the at least one non-geographical element at a spatial location within the display panel such that an overlap masking of the at least one geographical element by the at least one non-geographical element is minimized, wherein a non-geographical element is an element that is not a part of the map depiction of the navigation system,
  wherein the graphical elements comprise at least two geographical elements of different types, the method further comprising the steps of:
    assigning each of the at least two geographical elements to either a first priority class or a further priority class;
    arranging and displaying the at least two geographical elements within the display panel; and
    arranging and displaying the at least one non-geographical element within the display panel such that the masking of the geographical elements assigned to the first priority class by the at least one non-geographical element is minimized and the masking of the geographical elements assigned to the further priority class by the at least one non-geographical element is permitted, wherein
  the type of geographical elements assigned to the first priority class comprises roads that have already been traveled on by the vehicle, are being traveled on by the vehicle at present, and/or will probably be traveled on by the vehicle in the future.

2. The method as claimed in claim 1, wherein the masking is completely avoided.

3. The method as claimed in claim 1, further comprising the step of:
  under a circumstance where the arrangement of the at least one non-geographical element within the display panel occurs such that the masking of the at least one geographical element by the at least one non-geographical element is not avoided completely, displaying the at least one non-geographical element in an at least partly transparent depiction.

4. The method according to claim 1, wherein, in a route journey with the navigation system active, the roads that will probably be traveled on by the vehicle in the future are assigned to the first priority class and the roads that have already been traveled on by the vehicle are assigned to the further priority class.

5. A method for arranging and displaying graphical elements of a depiction of a vehicle navigation system within a display panel, wherein the graphical elements comprise at least one geographical element and one non- geographical element, the method comprising the steps of:
arranging and displaying the at least one geographical element within the display panel, wherein a geographical element is an element of a map depiction of the navigation system; and
arranging and displaying the at least one non-geographical element at a spatial location within the display panel, wherein a non-geographical element is an element that is not a part of the map depiction of the navigation system, and
the at least one non-geographical element is displayed in an at least partly transparent depiction if the at least one non-geographical element overlap masks the at least one geographical element at least partly,
wherein the graphical elements comprise at least two geographical elements of different type, the method further comprising the step of:
assigning each of the at least two geographical elements to either a first priority class or a further priority class, wherein
the at least one non-geographical element is displayed in the at least partly transparent depiction if the at least one non-geographical element masks the at least one geographical element assigned to the first priority class at least partly, and is permitted to be displayed in a non-transparent depiction if the at least one non-geographical element masks a geographical element assigned to the further priority class and
the type of geographical elements assigned to the first priority class comprises roads that have already been traveled on by the vehicle, are being traveled on by the vehicle at present and/or will probably be traveled on by the vehicle in the future.

6. The method according to claim 5, wherein, in a route journey with the navigation system active,
the roads that will probably be traveled on by the vehicle in the future are assigned to the first priority class and the roads that have already been traveled on by the vehicle are assigned to the further priority class.

7. A vehicle navigation system, comprising:
a display panel for displaying graphical elements, wherein the graphical elements comprise at least one geographical element and one non-geographical element; and
a control unit operatively configured to execute a process to:
arrange and display the at least one geographical element within the display panel, wherein a geographical element is an element of a map depiction of the navigation system; and
arrange and display the at least one non-geographical element at a spatial location within the display panel such that an overlap masking of the at least one geographical element by the at least one non-geographical element is minimized, wherein a non-geographical element is an element that is not a part of the map depiction of the navigation system,
wherein the graphical elements comprise at least two geographical elements of different types, the control unit being further configured to:
assign each of the at least two geographical elements to either a first priority class or a further priority class;
arrange and display the at least two geographical elements within the display panel; and
arrange and display the at least one non-geographical element within the display panel such that the masking of the geographical elements assigned to the first priority class by the at least one non-geographical element is minimized and the masking of the geographical elements assigned to the further priority class by the at least one non-geographical element is permitted, wherein
the type of geographical elements assigned to the first priority class comprises roads that have already been traveled on by the vehicle, are being traveled on by the vehicle at present, and/or will probably be traveled on by the vehicle in the future.

8. The vehicle navigation system according to claim 7, wherein, in a route journey with the navigation system active,
the roads that will probably be traveled on by the vehicle in the future are assigned to the first priority class and the roads that have already been traveled on by the vehicle are assigned to the further priority class.

9. A vehicle, comprising a vehicle navigation system as claimed in claim 7.

* * * * *